United States Patent
Yamaguchi et al.

(10) Patent No.: US 8,427,673 B2
(45) Date of Patent: Apr. 23, 2013

(54) SYSTEM, DEVICE, METHOD AND RECORDING MEDIUM FOR TRANSMITTING DATA UNDER TRANSMISSION CONDITIONS

(75) Inventors: Takehisa Yamaguchi, Ikoma (JP);
Hirohisa Miyamoto, Kobe (JP);
Minako Kobayashi, Ikeda (JP);
Katsuhiko Akita, Amagasaki (JP);
Okihisa Yoshida, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 946 days.

(21) Appl. No.: 12/195,576

(22) Filed: Aug. 21, 2008

(65) Prior Publication Data
US 2009/0059280 A1    Mar. 5, 2009

(30) Foreign Application Priority Data
Aug. 27, 2007   (JP) .................................. 2007-219827

(51) Int. Cl.
*G06F 3/12* (2006.01)
(52) U.S. Cl.
USPC ........................................ 358/1.15; 358/1.16
(58) Field of Classification Search ................. 358/1.15, 358/1.16; 715/739
See application file for complete search history.

(56) References Cited

U.S. PATENT DOCUMENTS

| | | | | |
|---|---|---|---|---|
| 6,801,340 | B1 * | 10/2004 | Endo .............................. | 358/403 |
| 7,370,080 | B2 * | 5/2008 | Yoshida ......................... | 709/206 |
| 2009/0201557 | A1 * | 8/2009 | Honma ........................... | 358/402 |

FOREIGN PATENT DOCUMENTS

| | | |
|---|---|---|
| JP | 11-205474 A | 7/1999 |
| JP | 2001-202296 | 7/2001 |
| JP | 2001-251472 | 9/2001 |
| JP | 2002-175248 | 6/2002 |
| JP | 2002-269002 | 12/2002 |
| JP | 2002-359648 | 12/2002 |
| JP | 2003-108479 A | 4/2003 |
| JP | 2003-134280 | 5/2003 |
| JP | 2005-012414 A | 1/2005 |
| JP | 2005-033733 | 2/2005 |
| JP | 2006-256118 | 9/2006 |

OTHER PUBLICATIONS

Japanese Office Action issued in corresponding Japanese Patent Application No. 2007-219827, dated Jul. 21, 2009, and English language translation.

* cited by examiner

*Primary Examiner* — Twyler Haskins
*Assistant Examiner* — Fred Guillermety
(74) *Attorney, Agent, or Firm* — Buchanan Ingersoll & Rooney PC

(57) ABSTRACT

Personal address books of users are stored in an address server. Each user registers, with the personal address book of his/her own, conditions (transmission conditions) that should be satisfied when other users transmit image data to the user. The conditions are registered in correspondence with addresses of the other users. When one of the other users transmits (as a transmission source) to the user (as a transmission destination) who has set the transmission conditions, from an MFP, the transmission conditions, which were set by the transmission destination user with respect to the transmitter, are downloaded from the address server to the transmission source MFP. And then the MFP transmits the image data to the transmission destination user under the downloaded transmission conditions. This enables the transmission destination user to cause the image data to be transmitted thereto under such conditions that match the needs of the transmission destination user.

13 Claims, 14 Drawing Sheets

FIG. 4

Personal address book of user A

| Transmission destination | Address | Group ID | Condition for transmission to A (set by receiver) | |
|---|---|---|---|---|
| | | | Time specification | Terminal specification |
| B | bbb@yyy.jp | — | None | aa1@xxx.jp(terminal 1) |
| C | ccc@zzz.jp | 001 | 9:00~10:00 | aa1@xxx.jp(terminal 1) |
| | | | 10:00~18:00 | aa2@xxx.jp(terminal 2) |
| | | | 18:00~24:00 | aa3@xxx.jp(terminal 3) |
| D | ddd@ppp.jp | — | None | aa1@xxx.jp(terminal 1) |
| E | eee@zzz.jp | 001 | 9:00~10:00 | aa1@xxx.jp(terminal 1) |
| | | | 10:00~18:00 | aa2@xxx.jp(terminal 2) |
| | | | 18:00~24:00 | aa3@xxx.jp(terminal 3) |
| F | fff@yyy.jp | — | 9:00~15:00 | aa1@xxx.jp(terminal 1) |
| | | | 15:00~18:00 | aa2@xxx.jp(terminal 2) |
| ... | ... | ... | ... | ... |

FIG. 15

Personal address book of user A

| Transmission destination | Address | Reliability | Group ID | Condition for transmission to A (set by receiver) | |
|---|---|---|---|---|---|
| | | | | Time specification | Terminal specification |
| B | bbb@yyy.jp | 1 | 001 | None | aa1@xxx.jp (terminal 1) |
| C | ccc@zzz.jp | 3 | 003 | 9:00~10:00 | aa1@xxx.jp (terminal 1) |
| | | | | 10:00~18:00 | aa2@xxx.jp (terminal 2) |
| | | | | 18:00~24:00 | aa3@xxx.jp (terminal 3) |
| D | ddd@ppp.jp | 1 | 001 | None | aa1@xxx.jp (terminal 1) |
| E | eee@zzz.jp | 3 | 003 | 9:00~10:00 | aa1@xxx.jp (terminal 1) |
| | | | | 10:00~18:00 | aa2@xxx.jp (terminal 2) |
| | | | | 18:00~24:00 | aa3@xxx.jp (terminal 3) |
| F | fff@yyy.jp | 2 | 002 | 9:00~15:00 | aa1@xxx.jp (terminal 1) |
| | | | | 15:00~18:00 | aa2@xxx.jp (terminal 2) |
| ... | ... | ... | ... | ... | ... |

FIG. 16

Personal address book of user A

| Transmission destination | Address | Deletion frequency (%) | Group ID | Condition for transmission to A (set by receiver) ||
|---|---|---|---|---|---|
| | | | | File format | Capacity restriction |
| B | bbb@yyy.jp | 65 | 003 | Only PDF | 20KB |
| C | ccc@zzz.jp | 5 | 001 | No restriction | 5MB |
| D | ddd@ppp.jp | 35 | 002 | No restriction | 1MB |
| E | eee@zzz.jp | 10 | 001 | No restriction | 5MB |
| F | fff@yyy.jp | 50 | 003 | Only PDF | 20KB |
| ... | ... | ... | ... | ... | ... |

SYSTEM, DEVICE, METHOD AND RECORDING MEDIUM FOR TRANSMITTING DATA UNDER TRANSMISSION CONDITIONS

This application is based on application No. 2007-219827 filed in Japan, the contents of which are hereby incorporated by reference.

BACKGROUND OF THE INVENTION (1) Field of the Invention

The present invention relates to an image transmission system for transmitting image data obtained by a scanner or the like to a device to which the transmission device is connected via a network, also relates to an image transmission device for use in the system, an image transmission method, and a recording medium in which a program for causing a computer to execute the image transmission method is recorded.

(2) Description of the Related Art

Along with the recent development of communication infrastructure, various protocols have been provided for use in transmitting image data to destinations via a network, and various formats of image data for transmission have been provided (hereinafter, all of the methods and formats for use in transmitting image data to destinations, including such protocols and image data formats, are generically referred to as "transmission conditions").

Under these circumstances, when a transmitter attempts to transmit image data to a destination, the transmitter needs to set transmission conditions by selecting appropriate ones from among a plurality of options.

Among technologies for allowing the transmitter to select transmission conditions, for example, Japanese Patent Application Publication No. 2005-12414 discloses a technology for allowing the transmitter to select appropriate transmission conditions from among a list of transmission conditions that have been preliminarily registered with an image transmission device with respect to the destination.

This technology enables the transmitter to select transmission conditions easily and speedily, when the transmitter attempts to transmit image data to a destination using the image transmission device.

However, this conventional technology has a problem that the image data may be transmitted under transmission conditions that do not match the needs of the receiver side because the transmission conditions with respect to the receiver (destination) are determined by the transmitter side.

For example, the receiver may be on a business trip and temporarily in an office that is not his/her home office, and there is no transmission condition that specifies the office on his/her business trip as the destination, among the transmission conditions (in this case, communication protocol, address and the like) registered with the image transmission device of the transmitter. In such a case, the receiver cannot receive image data from the transmitter while he/she is on the business trip, and both the transmitter who attempted to send the image data and the image data itself may be very important to him/her. This is an inconvenience to the receiver. On the other hand, the receiver may have some transmitters from whom the receiver need not receive image data while he/she is on a business trip.

SUMMARY OF THE INVENTION

The object of the present invention is therefore to provide an image transmission system with great convenience for transmitting image data under transmission conditions that match the needs of the receiver, the transmission conditions being set with respect to each transmitter or each group of transmitters, and to provide an image transmission device for use in the system, an image transmission method, and a recording medium in which a program for causing a computer to execute the image transmission method is recorded.

One aspect of the present invention is an image transmission system in which a server for providing image data transmission conditions is connected with a plurality of image transmission devices via a network, the server comprising: a transmission condition receiving part operable to receive a specification of transmission conditions which should be satisfied when image data is transmitted to a particular receiver, the transmission conditions being specified in correspondence with one or more different transmitters of the image data or in correspondence with one or more different groups of transmitters; and a transmission condition storage storing therein a transmission condition table with which the specified transmission conditions, the particular receiver, and the one or more transmitters or the one or more transmitter groups are registered in correspondence with each other, each of the plurality of image transmission devices comprising: a transmitter information obtaining part operable to obtain information that identifies a transmitter who transmits the image data; a receiver information receiving part operable to receive information that identifies a receiver who receives the transmitted image data; a transmission condition obtaining part operable to obtain, from the transmission condition storage of the server, transmission conditions that are stored in correspondence with the identified receiver and the identified transmitter or a group to which the identified transmitter belongs; and a transmitting part operable to transmit the image data to the identified receiver under the obtained transmission conditions.

Here, "the specified transmission conditions, the particular receiver, and the one or more transmitters or the one or more transmitter groups are registered in correspondence with each other" represents an idea that includes an operation of overwriting the stated contents to a transmission condition table (updating the table).

With the above-stated structure, the receiver can set the transmission conditions for each transmitter or each group of transmitters, so that the transmitters transmit the image data to the receiver under the set transmission conditions, and the transmission conditions can be set by taking into consideration the types of the transmitters, levels of importance of the transmitters and the like. Accordingly, with this structure, the receiver can receive image data that is transmitted thereto under preferable transmission conditions matching the needs of the receiver.

In the above-described image transmission system, in a case where a specification of transmission conditions specified in correspondence with one or more different groups of transmitters is received, the server may further comprise: a group making part operable to make a plurality of groups of transmitters by dividing a plurality of transmitters into the groups, and the transmission condition receiving part receives the specification of transmission conditions for each of the plurality of groups of transmitters made by the group making part.

The above-stated structure facilitates making groups of transmitters and facilitates setting transmission conditions for each of the groups.

In the above-described image transmission system, the server may further comprise: an address storage storing addresses in the network of the transmitters, and the group making part makes the groups of transmitters in accordance with domains of the addresses of the transmitters.

In the above-described image transmission system, the server may further comprise: a reliability storage for receiving a specification of reliability ranks assigned to the transmitters by the receiver, and stores therein the specified reliability ranks, and the group making part makes the groups of transmitters in accordance with the reliability ranks of the transmitters.

When transmitters are divided into groups in accordance with the reliability of the transmitters, it is possible to set the transmission conditions such that only transmitters with high reliability can have transmission conditions that will impose a large load on the receiver side (for example, image data to be transmitted is large in amount).

In the above-described image transmission system, the server may further comprise: a history information storage storing therein history information that is a history of operations performed by the receiver onto image data received from the transmitters, and the group making part makes the groups of transmitters in accordance with the history information.

Here, the operations performed by the receiver onto image data received from the transmitters include, for example, deleting an image file received from the transmitters, and leaving the received image file unopened.

The use of such history information makes it possible to make a group of transmitters who would transmit image data in which the receiver does not have much interest, and set common transmission conditions for the transmitters who belong to the group.

In the above-described image transmission system, the transmission conditions may include an address of a particular terminal specified by the receiver.

In the above-described image transmission system, the transmission conditions may include a transmission time period specified by the receiver.

With the above-stated structure, it is possible to cause image data to be transmitted to the receiver in a time period that is convenient for the receiver.

In the above-described image transmission system, the transmission conditions may include a restriction to a capacity of image data to be transmitted.

With the above-stated structure, it is possible to set transmission conditions that will not impose a load on the receiver side.

In the above-described image transmission system, the transmission conditions may include a type of a transmission method for transmitting image data.

Another aspect of the present invention is an image transmission device which is connected, via a network, with a server which provides image data transmission conditions, wherein the server includes a transmission condition table that receives a specification of transmission conditions which should be satisfied when image data is transmitted to a particular receiver, the transmission conditions being specified in correspondence with one or more different transmitters of the image data or in correspondence with one or more different groups of transmitters, and stores therein the specified transmission conditions, the particular receiver, and the one or more transmitters or the one or more transmitter groups are registered in correspondence with each other, and the image transmission device comprises: a transmitter information obtaining part operable to obtain information that identifies a transmitter who transmits the image data; a receiver information receiving part operable to receive information that identifies a receiver who receives the transmitted image data; a transmission condition obtaining part operable to obtain, from the transmission condition table of the server, transmission conditions that are stored in correspondence with the identified receiver and the identified transmitter or a group to which the identified transmitter belongs; and a transmitting part operable to transmit the image data to the identified receiver under the obtained transmission conditions.

With the above-stated structure, it is possible to provide an image transmission device that constitutes the above-stated image transmission system.

A still another aspect of the present invention is an image transmission method for use in the above-stated image transmission device.

A yet another aspect of the present invention is a recording medium recording therein a program that causes a computer to execute the above-stated image transmission method.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 shows an example of a personal address book of user A;

FIG. 15 shows another example of the personal address book; and

FIG. 16 shows still another example of the personal address book.

DESCRIPTION OF THE PREFERRED EMBODIMENT

The following describes a preferred embodiment of the present invention.

It should be noted here that the image transmission device described in the following embodiment is presumed to be a multi-functional-type image forming device (hereinafter referred to as MFP) that has a copy function, a printer function and the like, as well as the image transmission function.

<Structure of Image Transmission System>

Figure 1:
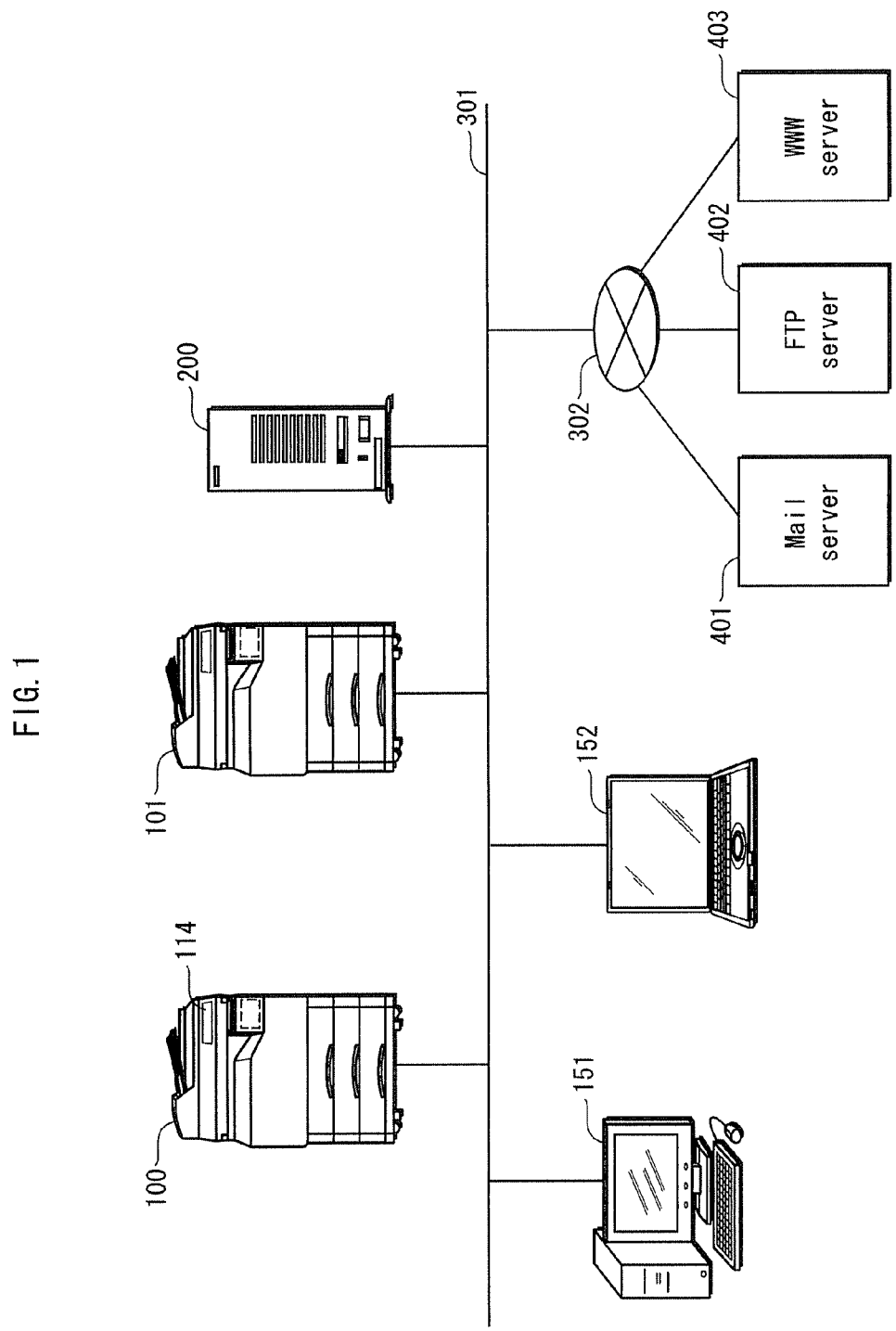
FIG. 1 shows the structure of an image transmission system of the present embodiment.

FIG. 1 shows the structure of an image transmission system including the MFP of the present embodiment.

As shown in FIG. 1, an image transmission system is composed of an MFP 100, 101, a personal computer (hereinafter merely referred to as PC) 151, 152, and an address server 200, which are all connected to a LAN (Local Area Network) 301.

The LAN 301 is connected to the Internet 302. The image transmission system is connected to a mail server 401, an FTP server 402, and a WWW server 403 via the Internet 302.

The above-indicated constituent elements that are connected to the LAN 301 or the Internet 302 are inter-connected in compliance with the TCP (Transmission Control Protocol)/IP (Internet Protocol) or the like. On the TCP/IP, available are variable types of communications such as WebDAV (Distributed Authoring and Versioning for the WWW), SMB (Server Message Block), SMTP (Simple Mail Transport Protocol), and FTP (File Transfer Protocol).

It should be noted here that the system structure shown in FIG. 1 is merely an example, and that the numbers of the MFPs, PCs, and the like included in the image transmission system are not limited to those indicated by FIG. 1.

<Structure of MFP 100>

Figure 2:
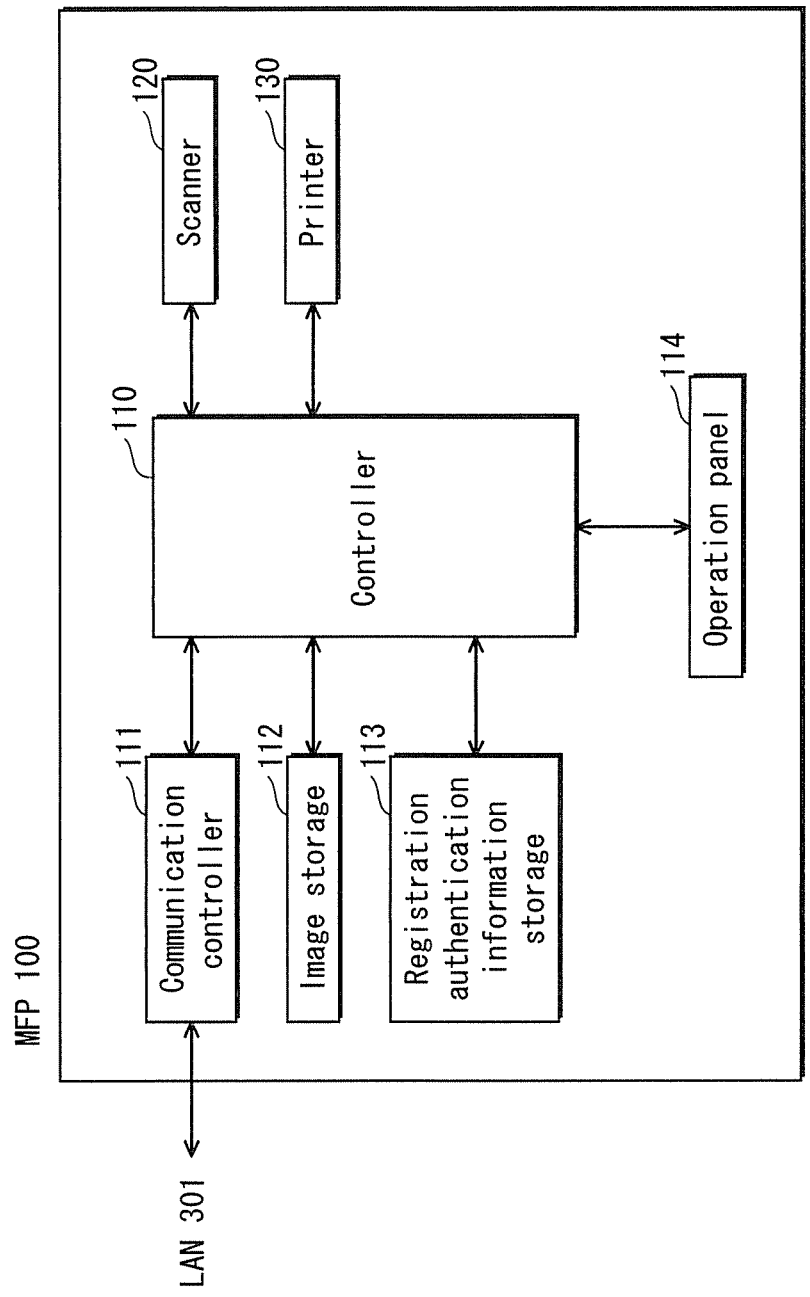
FIG. 2 is a functional block diagram that shows the structure of the MFP 100.

FIG. 2 is a functional block diagram that shows the structure of the MFP 100. As shown in FIG. 2, the MFP 100 includes a controller 110, a communication controller 111, an image storage 112, a registration authentication information storage 113, an operation panel 114, a scanner 120, and a printer 130.

The communication controller 111 is an interface used for connection to the LAN 301, and controls communications with constituent elements connected to the LAN 301. The control of the communications is performed using a predetermined protocol such as the TCP/IP.

The image storage 112 stores image data that was scanned by the scanner 120, and image data that was received from an external terminal via the communication controller 111.

The registration authentication information storage 113 stores registration authentication information of each of the users who have been registered preliminarily as persons who are permitted to use the MFP 100.

It should be noted here that each piece of the "registration authentication information" is composed of (i) a user name of a person who is permitted to use, and (ii) a password. The registration authentication information is referred to when the user attempts to log in to the MFP 100.

The operation panel 114 includes a plurality of input keys and a display (for example, a liquid crystal display). A touch panel is arranged on the front surface of the display. The operation panel 114 receives an instruction of the user via a touch input or a key input and notifies the controller 110 of the received instruction, where the touch input is made by touching the touch panel, and the key input is made by pressing the input keys.

The scanner 120 generates image data by scanning a document.

The printer 130 forms an image on a recording sheet based on the image data received from the controller 110.

The controller 110 includes a CPU, a ROM, a RAM, a hard disk device and the like. In accordance with a program stored in the ROM or the hard disk device, the controller 110 controls the operation of each component of the MFP 100 so that the copy job, print job, and image transmission job are smoothly executed, and also controls displaying on the display of the operation panel 114 and performs a transmission condition registration process which will be described later.

<Address Server 200>

Figure 3:
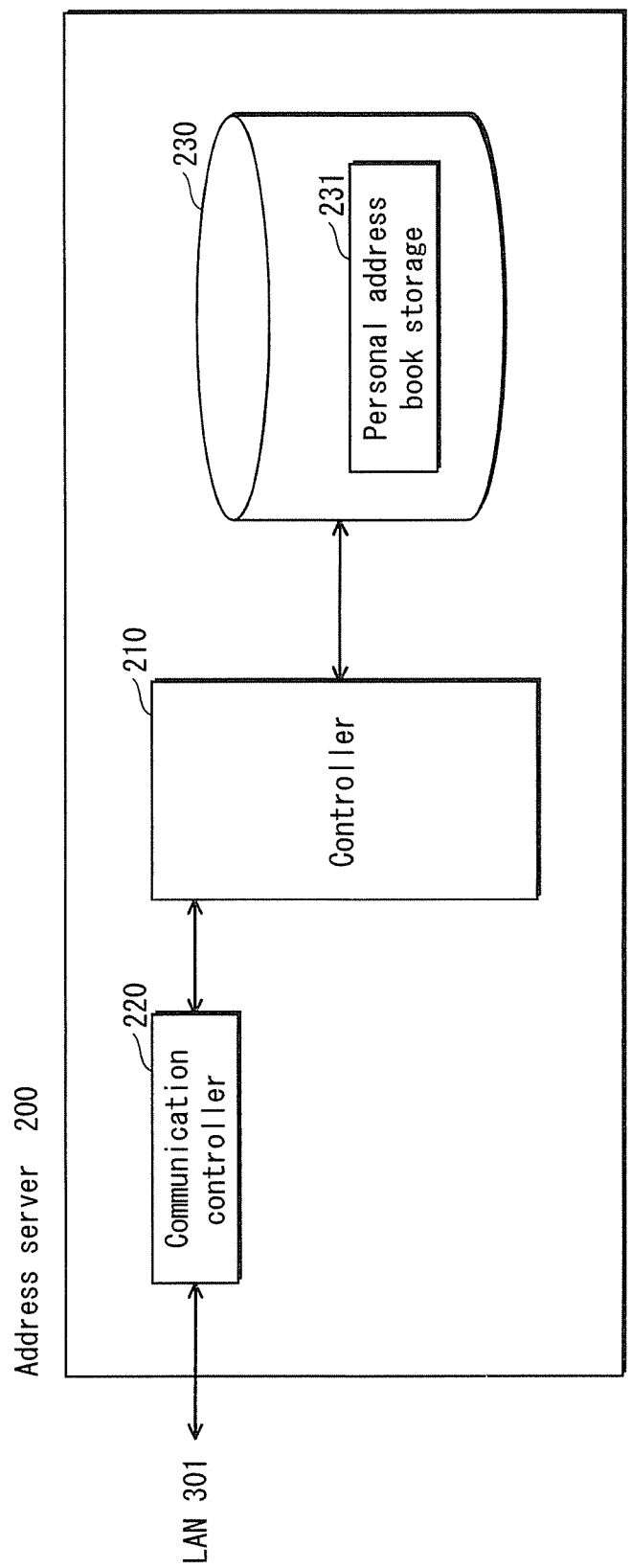
FIG. 3 is a functional block diagram showing the structure of the address server 200.

FIG. 3 is a functional block diagram showing the structure of the address server 200.

As shown in FIG. 3, the address server 200 includes a controller 210, a communication controller 220, a hard disk device 230, and a personal address book storage 231.

The communication controller 220 is an interface used for connection to the LAN 301, and controls communications with constituent elements of the image transmission system. The control of the communications is performed using a predetermined protocol such as the TCP/IP.

The personal address book storage 231 is provided in the hard disk device 230, and stores personal address books that were respectively set by users of the image transmission system.

It should be noted here that each "personal address book" is information that includes registrant information, transmission destination information, and receiver-set information.

The "registrant information" is information for identifying a person who set a personal address book (for example, the registrant information may be a name of the person who set the personal address book).

The transmission destination information is information relating to a name of a transmission destination to which image data is transmitted, and relating to an address of the transmission destination on the network.

The receiver-set information is information that indicates transmission conditions that should be satisfied when image data is transmitted to the person who set the personal address book, where the transmission conditions are specified by the person himself/herself.

The controller 210 includes a CPU, a ROM, a RAM, a hard disk device and the like. In accordance with a program stored in the ROM or the hard disk device, the controller 210 manages the personal address books.

More specifically, when it receives a request to register a personal address book from an external terminal via the communication controller 220, the controller 210 performs a control to receive data of the personal address book to be registered, and store it in the personal address book storage 231. Also, when it receives, from the MFP 100, a request to transmit a personal address book or transmission conditions, the controller 210 performs a control to search the personal address book storage 231 for the requested information, and transmit the retrieved information to the request source.

FIG. 4 shows an example of a table that constitutes a personal address book registered by user A. In the "transmission destination" column, transmission destination identification information for identifying the transmission destination is written (in this example, "user name" of the transmission destination). In the "address" column, information of the address of the transmission destination on the network is written (In the present embodiment, only electronic mail addresses are written in the address column as the address information, for convenience's sake. However, not limited to this, facsimile numbers or IP addresses may be written, depending on the transmission method). The combination of the transmission destination identification information and the address information is referred to as transmission destination information.

Registered in correspondence with each piece of transmission destination information are transmission conditions (receiver-set information) which should be satisfied when the transmission destinations transmit image data to user A.

In the present embodiment, the receiver-set information is composed of time specification information and terminal specification information.

Figure 5:
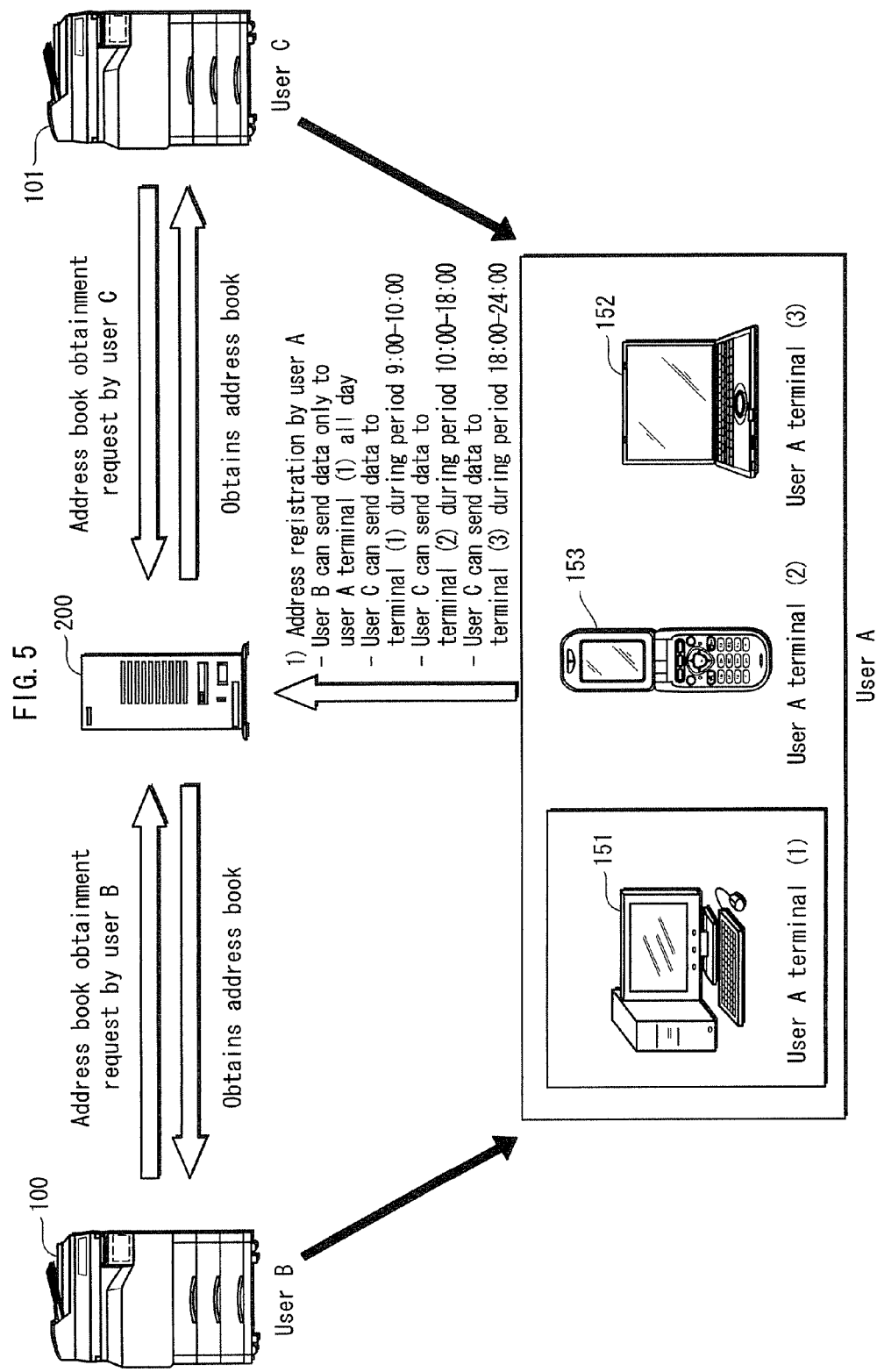
FIG. 5 is a schematic representation of a case where the MFP 100 (user B) and the MFP 101 (user C) contained in the image transmission system transmit image data to the terminal (the PC 151, the PC 152, or the mobile phone 153) of user A based on the transmission conditions set by the user A.

This arrangement is provided to adapt to the recent trend where reception terminals have increased in type as the variety has come to the communications infrastructures, and this arrangement enables each user to specify a plurality of types of terminals (in the present example, the user A uses terminals (1) to (3) shown in FIG. 5) in correspondence with different times of day, depending on the work or the life pattern.

As shown in FIG. 4, the user A specifies the addresses of the terminals (1) to (3) such that users C and E transmit data to the terminal (1) during a time period from 9:00 to 10:00, to the terminal (2) during a time period from 10:00 to 18:00, and to the terminal (3) during a time period from 18:00 to 24:00.

Also, with respect to the users B and D, the user A specifies the address of the terminal (1), but does not specify the time period such that the users B and D transmit data to the terminal (1) at any time of the day.

With respect to the user F, the user A specifies such that the user F transmits data to the terminal (1) during a time period from 9:00 to 15:00, and to the terminal (2) during a time period from 15:00 to 18:00.

It should be noted here that, in the present document and attached figures, for example, "9:00~10:00" indicates "from A.M.9:00 to A.M.10:00" where "A.M.10:00" is exclusive.

The above-described table is stored in the personal address book storage 231 in correspondence with the name of the user A (registrant information). Similar personal address books are generated respectively for users B, C, D, E . . . , and stored in the personal address book storage 231.

FIG. 5 is a schematic representation of a case where the users B and C transmit image data to the user A based on the receiver-set information specified in the above-described personal address book.

It is presumed here that the user A has three reception terminals: terminal (1) that is a desktop PC used in the office; terminal (2) that is a mobile terminal such as a mobile phone; and terminal (3) that is a note PC used in the home.

It is also presumed that the user B belongs to another division that is not the division of the user A, and the user C is a supervisor of the user A in the same office.

Under these presumptions, with respect to the user B, the user A sets the terminal (1) as the reception terminal, not specifying a time period for receiving. With respect to the user C, the user A specifies the terminal (1) as the reception terminal in correspondence with a time period (from 9:00 to 10:00) in which the user A is in the office, specifies the terminal (2) as the reception terminal in correspondence with a time period (from 10:00 to 18:00) in which the user A is on a business trip, and specifies the terminal (3) as the reception terminal in correspondence with a time period (from 18:00 to 24:00) in which the user A is at home.

When the user B attempts to transmit image data to the user A from the MFP 100, the user B downloads the address book of the user B itself from the address server 200, and specifies the user A as the transmission destination. The address server 200, in response to this, retrieves the address book of the user A and transmits the receiver-set information for the user B contained in the user A's address book to the MFP 100. This makes it possible for the user B to transmit the image data to the terminal (1) of the user A.

Similarly, with respect to the user C, the user C downloads the address book of the user C itself from the address server 200 to the MFP 101, the receiver-set information for the user C is transmitted to the MFP 101, and this makes it possible for the user C to transmit the image data to the specified terminal of the user A during the specified time period.

The above-described arrangement produces the following advantageous effects. Namely, the arrangement enables the user A to receive important communications from his/her supervisor, user C, at any time and any place where the user A is available. Also, the arrangement enables the user A to receive less important communications from another division, user B, with the terminal (1) placed in the office so that the user A can check on the received mails next day when he/she comes to the office.

Not limited to the above-described settings, for example, the user A may set transmission conditions for the user B so as to be similar to those for the user C, when it is highly possible that the user B may transmit an urgent communication.

It should be noted here that, in the address book shown in FIG. 4, for example, with respect to the user C, there is no specification of a time period from 24:00 to 9:00 the next day. In such a case, it may be controlled such that, during the time period that is not specified in the receiver-set information, the user C cannot transmit data to the user A, or the user C can transmit data to a default destination (for example, the terminal (1)).

<Control Operation>

The following describes, in detail, the control operation of each of the MFP 100 and the address server 200 performed in the image transmission system, with reference to a flowchart.

<Control Operation by Controller 110 of MFP 100>

(1) Overall Control Operation of MFP 100

Figure 6:
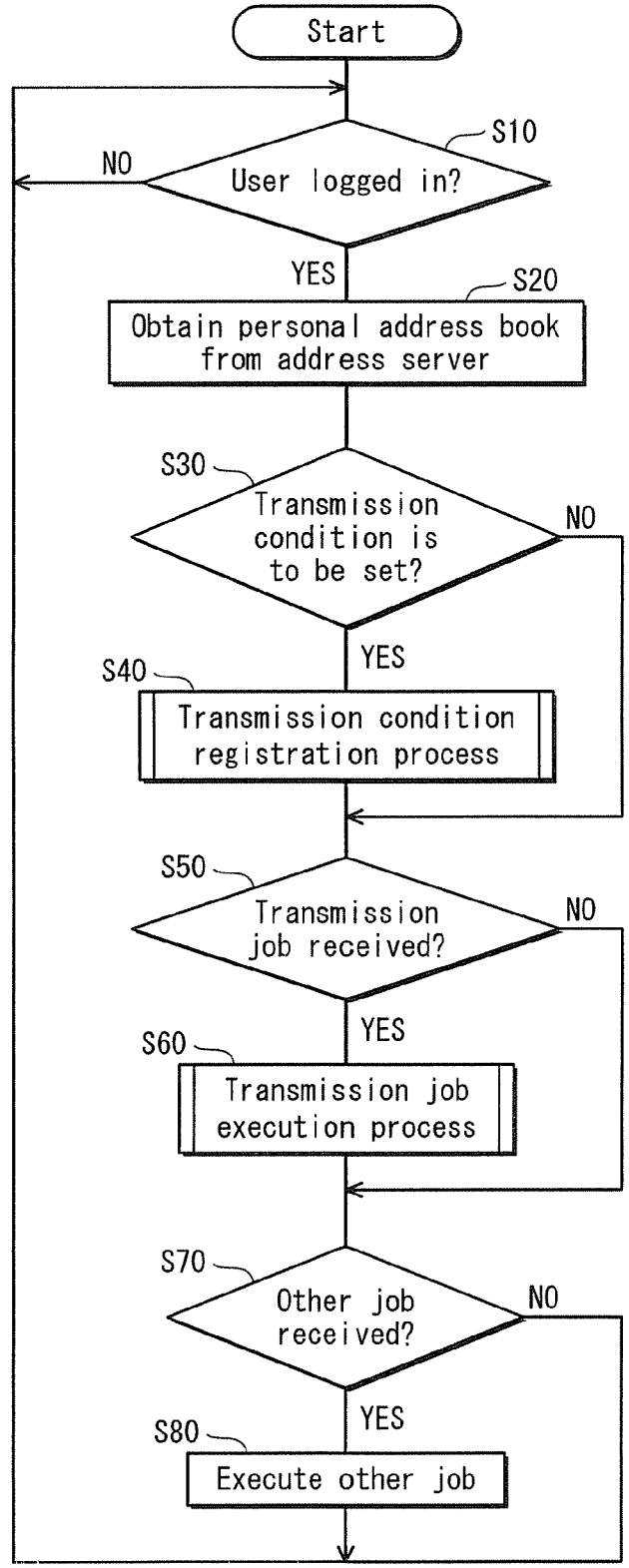
FIG. 6 is a flowchart showing the control operation performed by the controller 110 of the MFP 100.

FIG. 6 is a flowchart showing an outline of an overall control operation of the MFP 100.

As shown in FIG. 6, in the first step, it is judged whether a user has logged in (step S10). In this login process, the user inputs information (In this example, the user inputs his/her name. However, not limited to this, the user may input the user ID instead) that identifies the user itself, from the operation panel 114 of the MFP 100. It should be noted here that, since user names have already been registered with the registration authentication information storage 113, displaying the user names on the display of the operation panel 114 so that the user can select the displayed name to enter it would facilitate the user in inputting his/her name.

After this step, a message urging the user to input the password is displayed on the display of the operation panel 114, and the user inputs the password, which has been assigned to the user itself, via the numeric keypad or the like.

Names of users who are permitted to use the MFP 100 have preliminarily been registered with the registration authentication information storage 113 of the MFP 100, together with the passwords corresponding to the user names, by the administrator of the MFP 100 or the like. The controller 110 judges whether or not the user name and password received from the operation panel 114 match those registered with the registration authentication information storage 113. If they match, the controller 110 permits the user to log in and use the MFP 100.

When it judges that the user has logged in (YES in step S10), the controller 110 requests the address server 200 to transmit the data of the address book (see FIG. 4) of the user who has logged in, via the communication controller 111, and obtains the data of the address book from the address server 200 (step S20).

Next, it is judged whether a transmission condition is to be set (step S30).

In the present embodiment, when the user wants to set the transmission condition with respect to a certain transmitter for receiving data therefrom, the user can operate the operation panel 114 to switch to the utility mode setting screen, and can set the transmission condition on this screen, by selecting a tab for setting the transmission condition. Upon recognizing that the tab was selected, the controller 110 judges as "YES" in step S30, and performs the transmission condition registration process in step S40.

Next, it is judged whether a transmission job has been received (step S50). When it is judged that a transmission job has been received, the transmission job execution process is performed in step S60.

The judgment in step S50 is made by, for example, checking whether the image transmission job has been selected on the basic operation screen displayed on the operation panel 114.

It is presumed that a mode in which the scanned image data is attached to an electronic mail, and is transmitted with the electronic mail (hereinafter, the mode is referred to as "Scan to Email") is selected as the image transmission method in the present embodiment.

When it is judged that a transmission job has not been received in step S50, the control skips step S60 to move to step S70 in which it is judged whether another job has been received.

It should be noted here that "another job" indicates the copy job or print job other than the transmission job. In step S70, it is judged that a copy job has been received when it is checked that the copy mode was selected on the operation panel 114 and the start key was pressed. Also, it is judged that a print job has been received when the controller 110 received data of a print job via the communication controller 111 from an external terminal such as a PC.

In step S80, the received job (other than the transmission job) is executed.

The control then returns to step S10 to wait for another login of a user.

(2) Transmission Condition Registration Process

Figure 7:
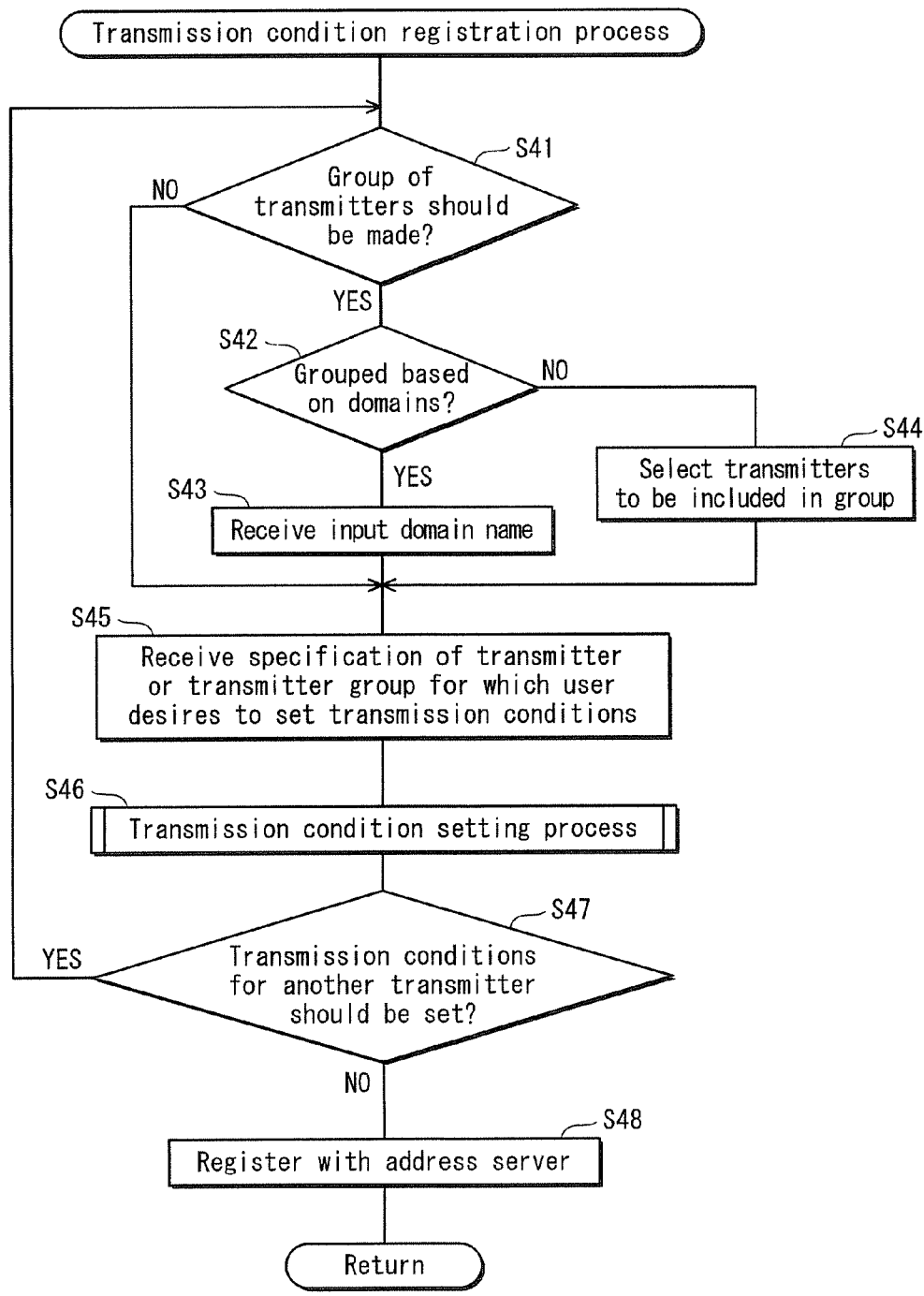
FIG. 7 is a flowchart showing the procedures of a subroutine for the transmission condition registration process performed in step S40 of FIG. 6.

FIG. 7 is a flowchart showing the procedures of a subroutine for the transmission condition registration process performed in step S40 of FIG. 6.

First, it is judged whether a group of transmitters should be made (step S41). When it is judged that a group of transmitters should be made (YES in step S41), it is judged whether the group of transmitters should be made based on domains of the addresses of the transmitters (step S42).

When it is judged as "YES" in step S42, a specification of a domain, based on which the group should be made, is received (step S43); and when it is judged as "NO" in step S42, transmitters to be included in the group are selected individually (step S44).

Figure 11:
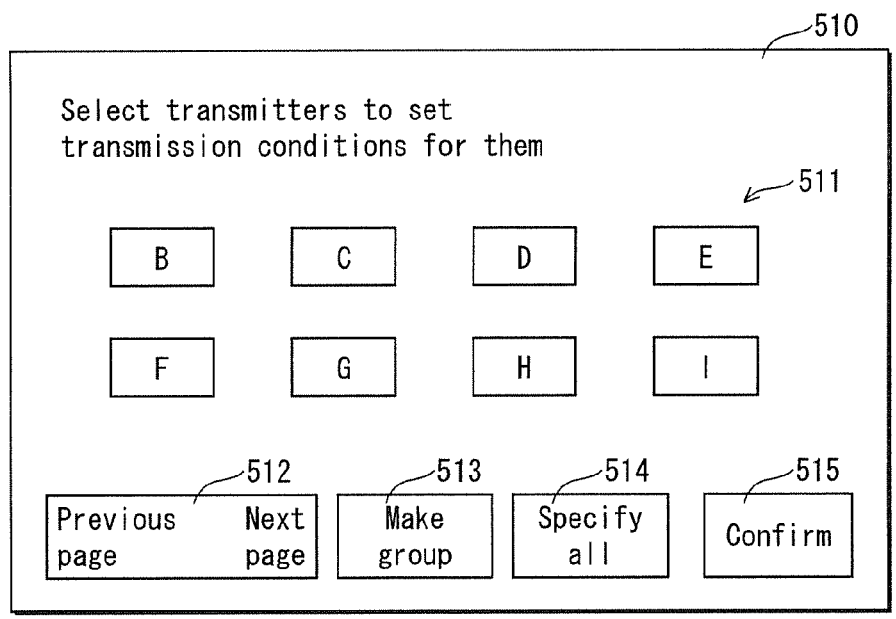
FIG. 11 shows an example of the setting screen for setting transmission conditions.

FIG. 11 shows an example of a setting screen 510 that is displayed on the operation panel 114 when the transmission condition registration process is performed (hereinafter, this screen is merely referred to as "setting screen on the operation panel 114").

Before the transmission condition registration process is performed, the table (see FIG. 4) being the personal address book of the user had been downloaded in step S20 after the user had logged in in step S10 of FIG. 6. From the obtained table, names of transmitters ("B", "C", ...) are extracted and a list of transmitters is created using the extracted transmitter names. Then displayed in the setting screen on the operation panel 114 is a transmitter selection button group 511 that is composed of images of buttons respectively indicating the transmitter names. In FIG. 11: the reference sign "512" represents a page switch button for displaying the previous page or the next page of the transmitter selection button group 511; the reference sign "513" represents a group-make button for specifying the transmitters to be included into the group; the reference sign "514" represents an all specification button for specifying all transmitters; and the reference sign "515" represents a confirmation button for confirming the selected transmitters.

Figure 12:
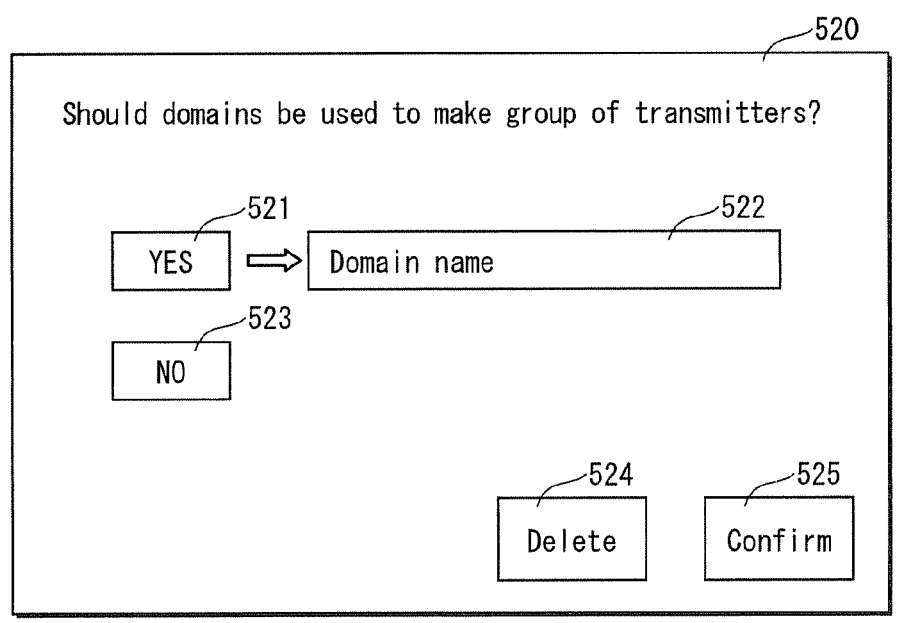
FIG. 12 shows an example of the setting screen for making a group of transmitters.

When the user presses the group-make button 513, it is judged as "YES" in step S41 (FIG. 7), and the screen switches to a setting screen 520 shown in FIG. 12.

When the user desires to make a group of transmitters composed of only transmitters who have a common domain of address, a "YES" button 521 should be pressed. When the "YES" button 521 is pressed, a domain name input field 522, for example, changes from a semi-transparent display to a solid-line display, so that the user can input therein a domain name based on which the group should be made.

To enable the user to input the domain name into the field, the alphabets may be assigned to the keys in the numeric keypad as in mobile phones, for the input via the numeric keypad, or a virtual keyboard may be displayed on a blank space of a display screen 520 for the input via the virtual keyboard. When the transmitters are set with use of a PC, the keyboard is used.

When the user presses the "YES" button 521, it is judged as "YES" in step S42, and when the characters are input into the domain name input field 522 and a "confirm" button 525 is pressed, the characters are received as the domain name (step S43).

It should be noted here that a "delete" button 524 is used to delete the domain name that was input into the domain name input field 522.

When the user desires to make a group of transmitters without use of a domain name, a "NO" button 523 should be pressed. When the "NO" button 523 is pressed, it is judged as "NO" in step S42, and then the control moves to step S44 in which transmitters selected by the user individually as those to be included in the group are received.

To enable the user to select the transmitters, the setting screen 510 shown in FIG. 11 is displayed. On the setting screen 510, when the user presses buttons corresponding to the transmitters desired for the group, among the buttons constituting the transmitter selection button group 511, the selected buttons are highlighted. Then, when the user presses the confirmation button 515, the selected transmitters are incorporated into the group.

After the group of transmitters is made in this way, an identifier of a same group (group ID) is attached to the "group ID" column in the table being the personal address book of the user (see FIG. 4).

When it is judged that a group of transmitters should not be made (NO in step S41), steps S42 through S44 are skipped.

Next, in step S45, received is specification of a transmitter or a transmitter group for which the user desires to set transmission conditions.

For receiving the specification of a transmitter, a screen similar to the setting screen 510 shown in FIG. 11 is displayed. Then, when the user presses a button corresponding to the desired transmitter, and then the confirmation button, the specification of the transmitter is received.

In the case of receiving the specification of a transmitter group, for example, in the setting screen 510 shown in FIG. 11, among the images of buttons of the transmitter selection button group 511, images of buttons corresponding to transmitters belonging to the same group are display-controlled to have a same color, same pattern, same shape, same mark or the like to indicate that the transmitters belong to the same group. And when the user presses any button that corresponds to a transmitter belonging to the group, all the transmitters belonging to the group are specified.

After this, in step S46, the transmission condition setting process is performed onto the selected transmitter or transmitter group.

Figure 8:
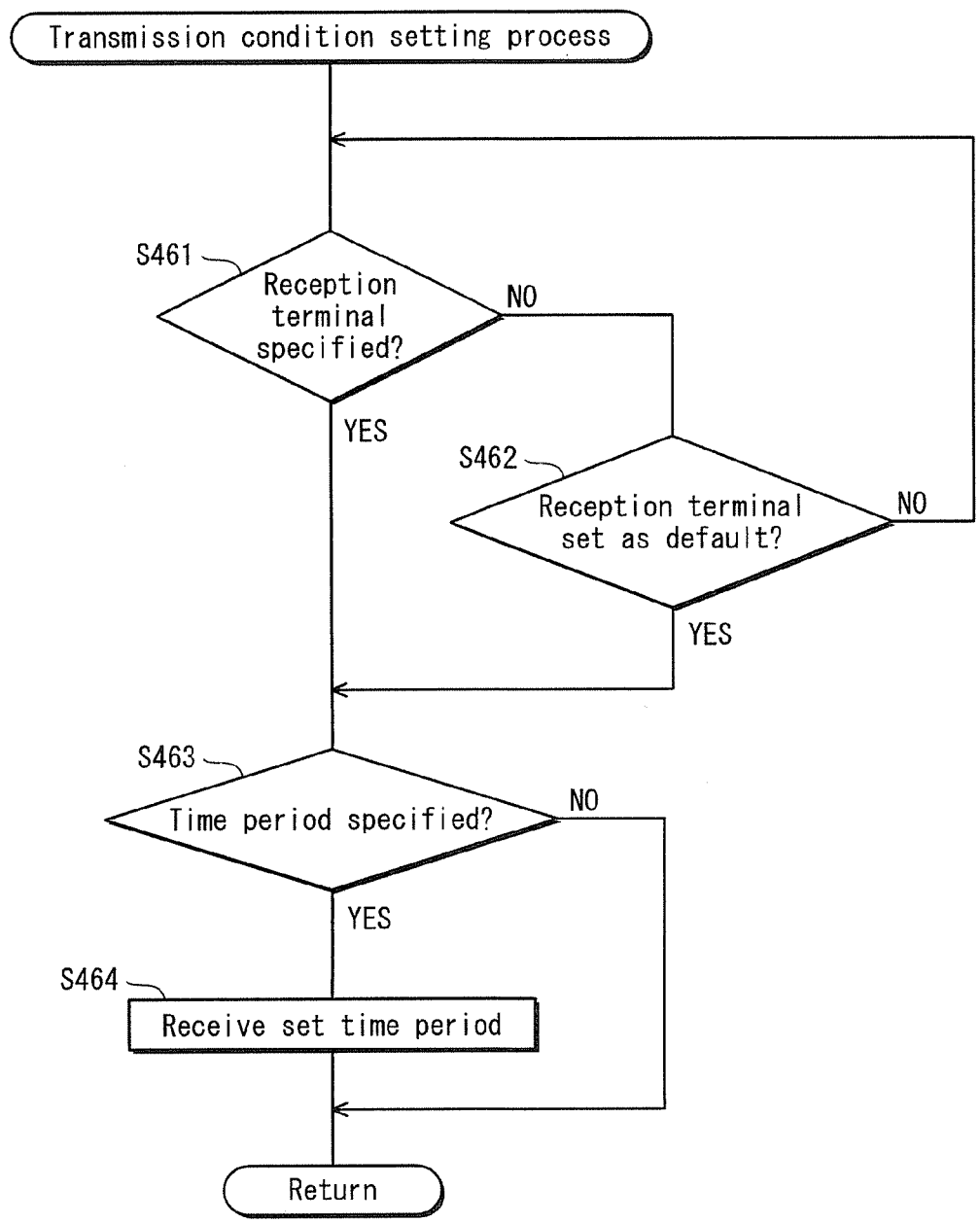
FIG. 8 is a flowchart showing the procedures of a subroutine for the transmission condition setting process performed in step S46 of FIG. 7.

FIG. 8 is a flowchart showing the procedures of a subroutine for the transmission condition setting process performed in step S46.

First, it is judged whether a reception terminal has been specified (step S461). When it is judged that no reception terminal has been specified (NO in step S461), it is judged whether a reception terminal has been set as a default (step S462). When it is judged that no reception terminal has been set as a default (NO in step S462), the control returns to step S461 to wait for specification of a reception terminal.

When it is judged that a reception terminal has been specified (YES in step S461), or when it is judged that no reception terminal has been specified, but that a reception terminal has been set as a default (NO in step S461 and YES in step S462), it is judged whether a time period has been specified with respect to the specified or default reception terminal (step S463). When it is judged that a time period has been specified (YES in step S463), the specified time period is registered with the table being the personal address book of the user, in correspondence with the specified or default reception terminal.

When it is judged that no time period has been specified (NO in step S463), the control returns to the flowchart shown in FIG. 7, with only the reception terminal registered.

Figure 13:
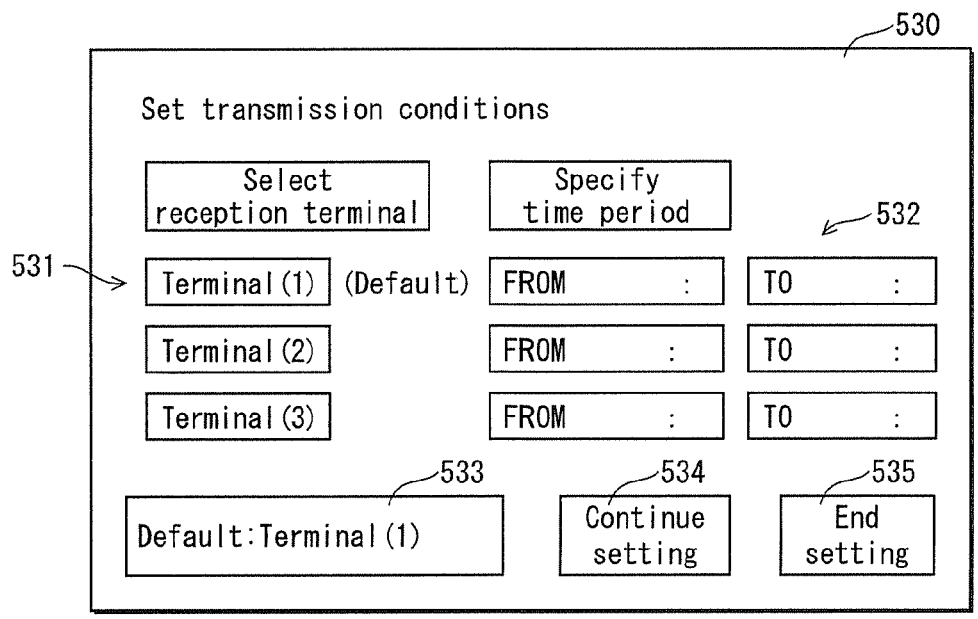
FIG. 13 shows an example of the setting screen for specifying reception terminals and time periods as the transmission conditions.

FIG. 13 shows an example of a setting screen 530 that is displayed on the operation panel 114 when the transmission condition setting process is performed.

In the present example, the user preliminarily registers, with a reception terminal information table (not illustrated), terminals (1) to (3) (see FIG. 5) as the terminals of the user itself and addresses of the terminals, in correspondence with the user ID of the user itself. To display the setting screen 530 shown in FIG. 13, the controller 110 reads the reception terminal information table corresponding to the logged in user name, and displays terminal specification buttons 531 corresponding to the terminals of the user.

To set a reception terminal as a default, the name of the reception terminal is input into a default setting field 533. In the present example, the terminal (1) is set as a default reception terminal.

Also, desired time periods can be specified by inputting start and end times of the desired time periods into a time period input field 532.

It should be noted here that the information such as the reception terminal information table or the default setting may be stored in a nonvolatile memory or the hard disk device in the controller 110, or may be stored in the personal address book storage 231 in the address server 200, as the property of the personal address book.

Back to FIG. 7, after step S46, it is judged whether transmission conditions for another transmitter should be set (step S47). When it is judged that the setting should be continued (YES in step S47), the control returns to step S41 to repeat the setting process by the receiver.

In this case, when it has already been judged as "NO" in step S41, the control may return to step S45 by skipping steps S42 through S44.

When it is judged that the setting process by the receiver has completed (NO in step S47), the contents of the setting process having been performed so far are registered with the downloaded personal address book (FIG. 4), and then the personal address book is uploaded to the address server 200 (step S48).

It should be noted here that the judgment in step S47 can easily be made by checking which of a setting continue button 534 and a setting end button 535 was pressed on the setting screen 530 shown in FIG. 13.

(3) Transmission Job Execution Process

Figure 9:
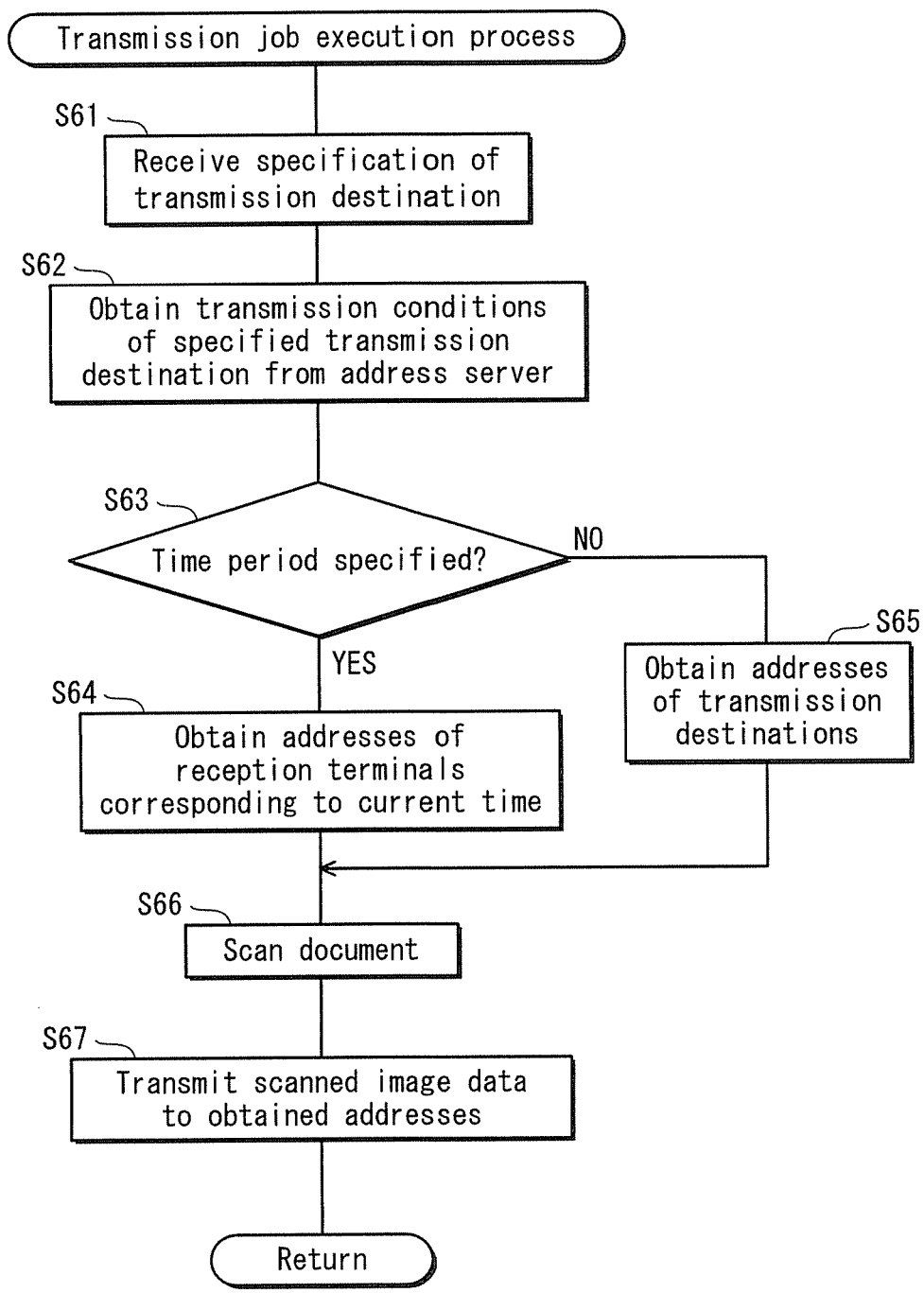
FIG. 9 is a flowchart showing the procedures of a subroutine for the transmission job execution process performed in step S60 of FIG. 6.

FIG. 9 is a flowchart showing the procedures of a subroutine for the transmission job execution process performed in step S60 of FIG. 6.

In this transmission job execution process, first, specification of a transmission destination is received (step S61).

Figure 14:
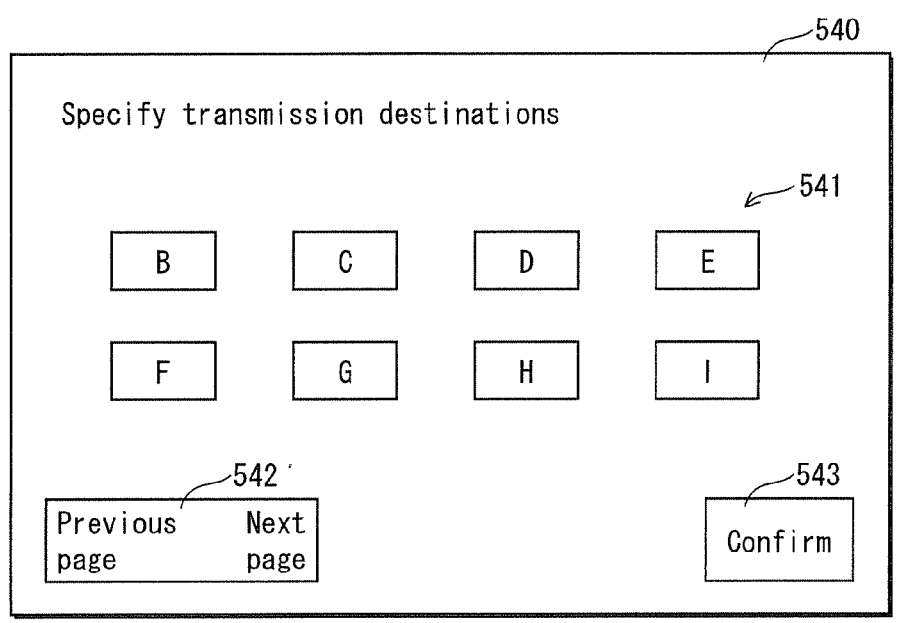
FIG. 14 shows an example of the setting screen for specifying transmission destinations when transmitting image data.

For the execution of the transmission job, a setting screen 540 shown in FIG. 14 is displayed on the operation panel 114. On the setting screen 540, when the user presses buttons, among transmission destination specification buttons 541, that correspond to the transmission destinations to which the user wants to transmit data and then presses a confirmation button 543, the transmission destinations are specified.

The transmission destination specification buttons 541 shown in FIG. 14 are created by extracting descriptions of the "transmission destination" column from the personal address book, as is the case with the buttons shown in FIG. 11.

In FIG. 14, the reference sign "542" represents a page switch button for displaying the previous page or the next page such that other transmission destinations can be specified.

When the user specifies any of the transmission destination specification buttons 541, and then presses the confirmation button 543, the controller 110 requests the address server 200 to send back the transmission conditions of the specified transmission destinations, and obtains the transmission conditions (step S62).

It is judged whether time periods have been specified in the obtained transmission conditions (step S63). When it is judged that time periods have been specified (YES in step S63), the controller 110 obtains the current time based on the clock IC provided in the CPU of the controller 110. The controller 110 then obtains addresses of the reception terminals being transmission destinations, among the specified transmission destinations, for which the time periods including the current time have been specified (step S64).

When it is judged that time periods have not been specified (NO in step S63), the controller 110 obtains only addresses of the reception terminals being the specified transmission destinations (step S65).

After this, the document placed on the document tray is scanned while it is transported by the automatic document feeder (ADF) (step S66). The scanned image data is attached to an electronic mail, and the electronic mail is transmitted to the addresses obtained in step S64 or S65 (step S67), and the control returns to the flowchart shown in FIG. 6.

<Operation of Address Server 200>

Figure 10:
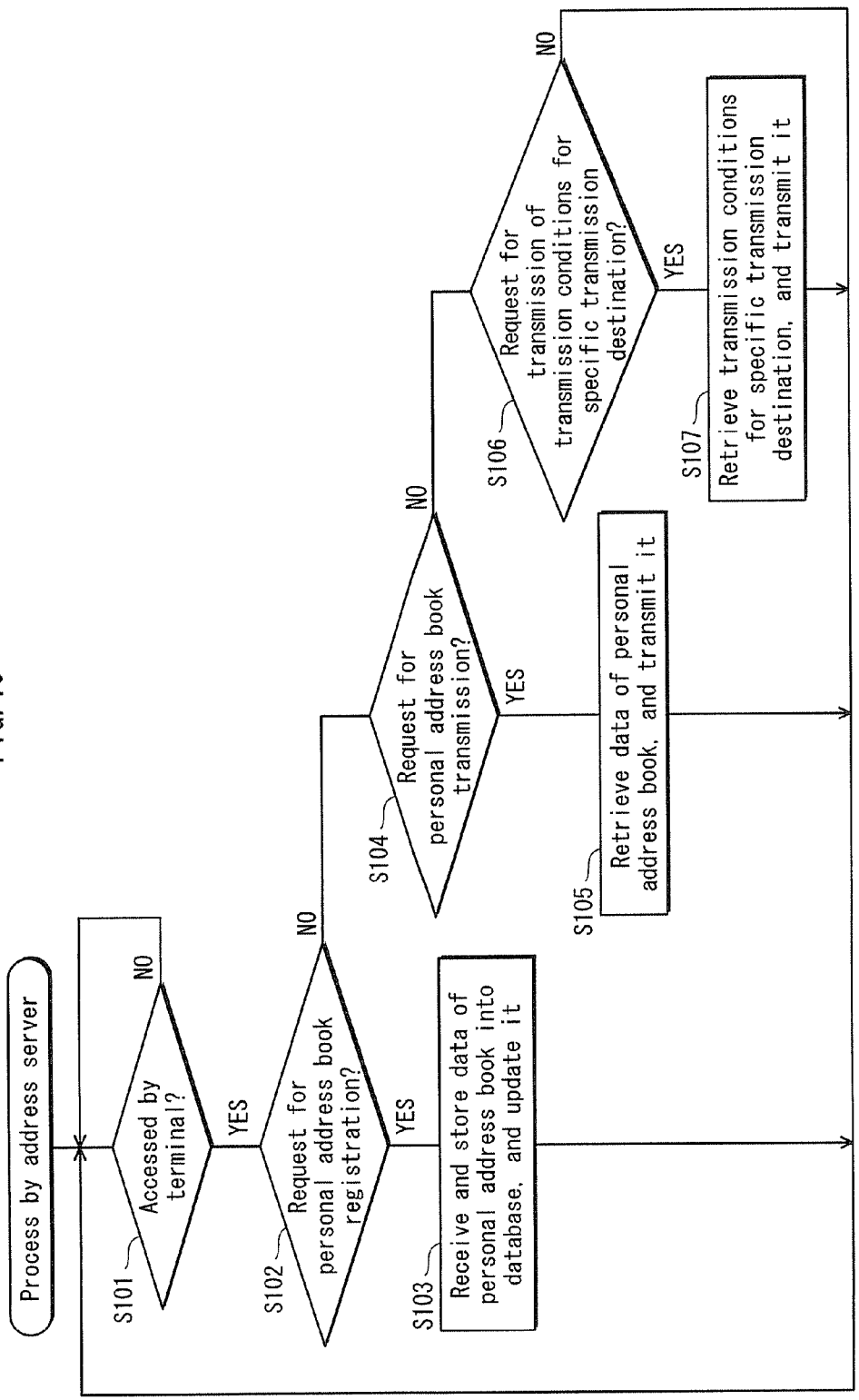
FIG. 10 is a flowchart showing the procedures of the process performed by the address server 200.

FIG. 10 is a flowchart showing the procedures of the control performed by the controller 210 of the address server 200.

The present example explains only a process that is performed when the address server 200 is accessed by an external terminal such as the MFP 100, the MFP 101, the PC 151, or the PC 152.

First, the controller 210 judges whether the address server has been accessed by an external terminal (step S101). When the address server has been accessed by an external terminal (YES in step S101), the controller 210 judges whether a request for registering a personal address book has been received (step S102).

When a request for registering a personal address book has been received (YES in step S102), the controller 210 extracts data of the personal address book from the received data, and stores the extracted data into the personal address book storage 231 in correspondence with the user name (or user ID) of the request source. When the personal address book of the user has already been stored, the controller 210 updates the existent personal address book by overwriting it with the new one (step S103). The control then returns to step S101 to wait for a next access by a terminal.

When the controller 210 judges that a request for registering a personal address book has not been received in step S102, the controller 210 judges whether a request for transmitting a personal address book has been received (step S104).

When a request for transmitting a personal address book has been received (YES in step S104), the controller 210 retrieves the personal address book, which is stored in correspondence with the user name (or user ID) of the request source, from the personal address book storage 231, and transmits the retrieved data to the IP address of the request source (step S105). Then the control returns to step S101.

When the controller 210 judges that a request for transmitting a personal address book has not been received in step S104, the controller 210 judges whether a request for transmitting transmission conditions for a specific transmission destination has been received (step S106).

When a request for transmitting transmission conditions for a specific transmission destination has been received (YES in step S106), the controller 210 retrieves the transmission conditions having been set for the request source, and transmits the retrieved transmission conditions to the request source (step S107). The control then returns to step S101.

Suppose here that the request source is user "A", specifying "B" as the transmission destination. Then, the address server 200 retrieves from the personal address book storage 231 the transmission conditions for the user "A", among the transmission conditions set by the user "B" and transmits the retrieved information to the terminal of the user "A" who is the request source.

It should be noted here that, when the transmission destination user has not set transmission conditions, the default contents are notified to the request source.

There may be a case where all users, who have been registered as transmission destinations with the personal address book of each user, may not have registered their own personal address books with the address server 200. In such a case, the transmission conditions are not found in step S107. To cope with such a case, a message, such as "transmission conditions set by the transmission destination are not found", may be sent to the request source. This also applies to the case where the personal address book of the transmission destination has been registered, but the transmission conditions and default have not been set.

After receiving such a message, the user A can transmit data to the address registered with the personal address book of the user A itself.

<Supplementary Notes>

Up to now, the image transmission system of the present invention has been described through an embodiment thereof. However, the present invention is not limited to the embodiment, but may include, for example, the following modifications.

(1) Methods for Making Groups

In the above-described embodiment, domains of the addresses of the transmitters are used to make a group of transmitters who are registered with the personal address book storage (see step S42 shown in FIG. 7). However, not limited to this, groups can be made based on any appropriate standards that are determined depending on the needs of the receivers.

For example, groups may be made based on "reliability" of the transmitters. The "reliability" is set arbitrarily by the judgment of the receiver.

FIG. 15 shows an example of the personal address book registered by user A in this modification. As shown in FIG. 15, the personal address book includes a "reliability" column. To set the reliability, for example, the user A inputs a numeral on a scale of one to three (the higher the numeral is, the higher the reliability is) from the operation panel 114.

Using the reliability scale, transmitters can be divided into groups that respectively correspond to the reliability levels.

Further, groups may be made based on the history information of the electronic mail.

More specifically, for example, the user A might have received 100 electronic mails from the user B in the past, and might have deleted 60 out of them as being unworthy of retention. In this way, the number of received mails and the number of deleted mails with respect to the user B can be obtained as the history information of the electronic mail, and can be stored preliminarily. And then, upon receiving an instruction from the user A, or at regular intervals, a ratio of the number of deleted mails to the number of received mails (deletion frequency) may be calculated, and the calculated ratio may be displayed by percentage (%) and registered with the "deletion frequency" column of the personal address book for each user, as shown in FIG. 16. Then, the deletion frequency is divided into certain ranges (for example, 0%-20%, 20%-50%, and 50%-100%) having respective ranks. And, upon receiving an instruction from the user A, transmitters may be divided into the groups that respectively correspond to the ranks based on the deletion frequencies. There is a tendency that transmitters with higher deletion frequencies send a higher number of unnecessary mails. In view of this, it is possible to reduce the load on the receiver side by setting the reception conditions such that the capacity of the attached file is restricted with respect to the mails from the transmitters with higher deletion frequencies.

As other examples, it is possible to use, as the standard based on which transmitters are to be grouped, (a) a history that is composed of only the number of received electronic mails, (b) the number of electronic mails that have been left unopened, or (c) a history with respect to the capacity of the attached files, depending on contents of the transmission conditions.

(2) In the above-described embodiment, the setting of transmission conditions is composed of specifying the reception terminals and reception time periods. However, the transmission conditions are not limited to this.

For example, as shown in the example of personal address book of FIG. 16, the capacity of an image file to be transmitted may be restricted, or the format of the image may be specified (for example, the available formats include PDF, JPEG, and TIF). Especially, it is possible to reduce the load of the receiver in viewing received information, or to reduce the amount of consumed toner when received data is output from an MFP, by restricting the capacity of information transmitted from transmitters with lower reliabilities or higher deletion frequencies.

(3) In the above-described embodiment, the electronic mail (SMTP) is used as the transmission method as a whole, for the sake of convenience. However, not limited to this, other transmission methods (for example, the aforementioned communication protocols such as WebDAV, SMB and FTP) may be set as the transmission conditions.

Further, it can be applied to a case where image data is transmitted from a facsimile device that is connected with the address server 200 via a network.

(4) Explained in the above-described embodiment is an example where a receiver can set transmission conditions on the operation panel of an MFP. However, not limited to this, for example, a predetermined transmission condition setting program may be installed into a personal computer, and when the installed program causes the computer to display a setting screen on the monitor thereof, a user may input necessary items of information via the keyboard or mouse. Or as the case may be, users may input the transmission conditions directly into the address server 200. As a result, the "transmission condition receiver" defined in Claim 1 of the present invention is not limited to an operation panel of an image transmission/reception device such as an MFP, but may be an input device of the address server 200 itself or an input device of another terminal connected to the address server 200 via a network.

(5) The program for achieving the transmission condition registration process explained in the above-described embodiment may be recorded onto any of various types of computer-readable recording mediums such as magnetic tape, magnetic disk such as flexible disk, optical recording medium such as DVD, CD-ROM, CD-R, MO, or PD, Smart Media (trademark), or flash memory type recording medium such as COMPACTFLASH (trademark). The program of the present invention may be manufactured or transferred in the form of such a recording medium, or may be transmitted or distributed in the form of a program via any of various types of wired or unwired networks including the Internet, broadcast, electronic communication line, or satellite communication.

Further, the program for achieving the present invention may not necessarily include all the modules to cause a computer to execute the above-described processes. For example, it is possible to cause a computer to execute each process of the present invention by using any of various types of general-purpose programs, such as a communication program or a program contained in an operating system (OS), that can be installed separately in the information processing device.

(6) Explained in detail in the above-described embodiment is a case where the present invention is applied to an MFP, as an example of an image transmission device of the present invention. However, not limited to this, the image transmission device of the present invention may be any device that can execute an image transmission job and can be connected to the address server 200 via a network, such as a dedicated scanner, a dedicated copier, or a dedicated facsimile machine.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image transmission system in which a server for providing image data transmission conditions is connected with a plurality of image transmission devices via a network, the server comprising:
    a transmission condition receiving part operable to receive a specification of transmission conditions which should be satisfied when image data is transmitted to a particular receiver, the transmission conditions being specified in correspondence with one or more different transmitters of the image data or in correspondence with one or more different groups of transmitters;
    a storage storing therein a plurality of personal address books, each personal address book corresponding to a registrant, and each personal address book including (1) information identifying at least one transmission destination to which image data is transmitted and (2) at least one transmission condition which should be satisfied when image data is transmitted to the registrant of the personal address book from a particular transmitter or transmitters or from a particular group of transmitters or groups of transmitters;
    a personal address book transmitting part operable to, upon receiving a first request from an image transmission device, transmit a personal address book corresponding to a transmitter specified by the first request;
    a searching part operable to, upon receiving from the image transmission device a second request specifying a receiver, search a personal address book corresponding to the receiver for at least one transmission condition corresponding to the transmitter specified by the first request;
    a transmission condition transmitting part operable to transmit the at least one transmission condition found by the searching part to the image transmission device;
    each of the plurality of image transmission devices comprising:
    a transmitter information obtaining part operable to obtain information that identifies a transmitter who transmits the image data;
    a personal address book obtaining part operable to obtain, from the storage of the server, a personal address book corresponding to the transmitter identified by the information obtained by the transmitter information obtaining part;
    a receiver information receiving part operable to receive information that identifies a receiver included in the obtained personal address book, the receiver being the desired recipient of the image data to be transmitted;
    a transmission condition obtaining part operable to obtain, a personal address book corresponding to the identified receiver stored in the storage of the server, after the personal address book obtaining part has obtained the personal address book corresponding to the identified transmitter, at least one transmission condition corresponding to the identified receiver and the identified transmitter or a group to which the identified transmitter belongs; and
    a transmitting part operable to transmit the image data to the identified receiver under the obtained transmission conditions.

2. The image transmission system of claim 1, wherein in a case where a specification of transmission conditions specified in correspondence with one or more different groups of transmitters is received,
    the server further comprises:
    a group making part operable to make a plurality of groups of transmitters by dividing a plurality of transmitters into the groups, and
    the transmission condition receiving part receives the specification of transmission conditions for each of the plurality of groups of transmitters made by the group making part.

3. The image transmission system of claim 2, wherein the server further comprises:
    an address storage storing addresses in the network of the transmitters, and
    the group making part makes the groups of transmitters in accordance with domains of the addresses of the transmitters.

4. The image transmission system of claim 2, wherein the server further comprises:

a reliability storage for receiving a specification of reliability ranks assigned to the transmitters by the receiver, and stores therein the specified reliability ranks, and the group making part makes the groups of transmitters in accordance with the reliability ranks of the transmitters.

5. The image transmission system of claim 2, wherein the server further comprises:

a history information storage storing therein history information that is a history of operations performed by the receiver onto image data received from the transmitters, and the group making part makes the groups of transmitters in accordance with the history information.

6. The image transmission system of claim 1, wherein the transmission conditions include an address of a particular terminal specified by the receiver.

7. The image transmission system of claim 1, wherein the transmission conditions include a transmission time period specified by the receiver.

8. The image transmission system of claim 1, wherein the transmission conditions include a restriction to a capacity of image data to be transmitted.

9. The image transmission system of claim 1, wherein the transmission conditions include a type of a transmission method for transmitting image data.

10. An image transmission device which is connected, via a network, with a server which provides image data transmission conditions, wherein the server includes a transmission condition table that stores a plurality of personal address books, each personal address book corresponding to a transmitter of image data and including information about at least one receiver of image data, receives a specification of transmission conditions which should be satisfied when image data is transmitted to a particular receiver, the transmission conditions being specified in correspondence with one or more different transmitters of the image data or in correspondence with one or more different groups of transmitters, and stores therein the specified transmission conditions, the particular receiver, and the one or more transmitters or the one or more transmitter groups are registered in correspondence with each other, and the image transmission device comprises:

a transmitter information obtaining part operable to obtain information that identifies a transmitter who transmits the image data;

a personal address book obtaining part operable to obtain, from the server, a personal address book corresponding to the transmitter identified by the information obtained by the transmitter information obtaining part;

a receiver information receiving part operable to receive information that identifies a receiver included in the obtained personal address book, the receiver being the desired recipient of the image data to be transmitted;

a transmission condition obtaining part operable to obtain, from the transmission condition table of the server, after the personal address book obtaining part has obtained the personal address book corresponding to the identified transmitter, at least one transmission condition corresponding to the identified receiver and the identified transmitter or a group to which the identified transmitter belongs; and a transmitting part operable to transmit the image data to the identified receiver under the obtained transmission conditions.

11. An image transmission method for use in an image transmission device which is connected, via a network, with a server which provides image data transmission conditions, wherein the server receives a specification of transmission conditions which should be satisfied when image data is transmitted to a particular receiver, the transmission conditions being specified in correspondence with one or more different transmitters of the image data or in correspondence with one or more different groups of transmitters, the server stores therein a plurality of personal address books, each personal address book corresponding to a registrant, and each personal address book including (1) information identifying at least one transmission destination to which image data is transmitted and (2) at least one transmission condition which should be satisfied when image data is transmitted to the registrant of the personal address book from a particular transmitter or transmitters or from a particular group of transmitters or groups of transmitters, the server, upon receiving a first request from an image transmission device, transmits a personal address book corresponding to a transmitter specified by the first request, the server, upon receiving from the image transmission device a second request specifying a receiver, searches a personal address book corresponding to the receiver for at least one transmission condition corresponding to the transmitter specified by the first request, and the server, transmits the at least one transmission condition found by the server to the image transmission device, and the image transmission method comprises:

a transmitter information obtaining step for obtaining information that identifies a transmitter who transmits the image data;

a personal address book obtaining step for obtaining, from the server, a personal address book corresponding to the transmitter identified by the information obtained by the transmitter information obtaining part;

a receiver information receiving step for receiving information that identifies a receiver included in the obtained personal address book, the receiver being the desired recipient of the image data to be transmitted;

a transmission condition obtaining step for obtaining, from the personal address book corresponding to the identified receiver stored in the server, after the personal address book corresponding to the identified transmitter has been obtained, at least one transmission condition corresponding to the identified receiver and the identified transmitter or a group to which the identified transmitter belongs; and a transmitting step for transmitting the image data to the identified receiver under the obtained transmission conditions.

12. A non-transitory recording medium recording therein a program to be executed in an image transmission device which is connected, via a network, with a server which provides image data transmission conditions, wherein the server receives a specification of transmission conditions which should be satisfied when image data is transmitted to a particular receiver, the transmission conditions being specified in correspondence with one or more different transmitters of the image data or in correspondence with one or more different groups of transmitters, stores therein a plurality of personal address books, each personal address book corresponding to a registrant, and each personal address book including (1) information identifying at least one transmission destination to which image data is transmitted and (2) at least one transmission condition which should be satisfied when image data is transmitted to the registrant of the personal address book from a particular transmitter or transmitters or from a particular group of transmitters or groups of transmitters, the server, upon receiving a first request from an image transmission device, transmits a personal address book corresponding to a transmitter specified by the first request, the server, upon receiving from the image transmission device a second request specifying a receiver, searches a personal address book corresponding to the receiver for at least one transmission condition corresponding to the transmitter specified by the first request, and the server, transmits the at least one transmission condition found by the server to the image transmission device, and the program causes a computer of the image transmission device to perform:

a transmitter information obtaining process for obtaining information that identifies a transmitter who transmits the image data;

a personal address book obtaining process for obtaining, from the server, a personal address book corresponding to the transmitter identified by the information obtained by the transmitter information obtaining part;

a receiver information receiving process for receiving information that identifies a receiver included in the obtained personal address book, the receiver being the desired recipient of the image data to be transmitted;

a transmission condition obtaining process for obtaining, a personal address book corresponding to the identified receiver stored in the server, after the personal address book corresponding to the identified transmitter has been obtained, at least one transmission condition corresponding to the identified receiver and the identified transmitter or a group to which the identified transmitter belongs; and a transmitting process for transmitting the image data to the identified receiver under the obtained transmission conditions.

13. An image transmission system in which a server for providing image data transmission conditions is connected with a plurality of image transmission devices via a network, the server comprising:

a transmission condition receiving part operable to receive a specification of transmission conditions which should be satisfied when image data is transmitted to a particular receiver, the transmission conditions being specified in correspondence with one or more different transmitters of the image data or in correspondence with one or more different groups of transmitters;

a transmission condition storage storing therein a transmission condition table with which the specified transmission conditions, the particular receiver, and the one or more transmitters or the one or more transmitter groups are registered in correspondence with each other; and each of the plurality of image transmission devices comprising:

a transmitter information obtaining part operable to obtain information that identifies a transmitter who transmits the image data;

a receiver information receiving part operable to receive information that identifies a receiver who receives the transmitted image data;

a transmission condition obtaining part operable to obtain, from the transmission condition storage of the server, transmission conditions that are stored in correspondence with the identified receiver and the identified transmitter or a group to which the identified transmitter belongs;

a transmitting part operable to transmit the image data to the identified receiver under the obtained transmission conditions; and wherein in a case where a specification of transmission conditions specified in correspondence with one or more different groups of transmitters is received, the server further comprises:

a group making part operable to make a plurality of groups of transmitters by dividing a plurality of transmitters into the groups, and the transmission condition receiving part receives the specification of transmission conditions for each of the plurality of groups of transmitters made by the group making part.

* * * * *